United States Patent [19]

[11] 3,995,282 d'Alton-Rauch et al.

[45] Nov. 30, 1976

[54] DEVICE FOR SELECTIVELY TRANSFERRING SPOTS OF LIQUID INK

[75] Inventors: Ilse-Dore Stromberger d'Alton-Rauch; Klaus Witter, both of Hamburg, Germany

[73] Assignee: U.S. Philips Corporation, New York, N.Y.

[22] Filed: Dec. 4, 1974

[21] Appl. No.: 529,361

[30] Foreign Application Priority Data

Dec. 12, 1973 Germany ............................ 2361762

[52] U.S. Cl. ............................. 346/140 R; 346/141

[51] Int. Cl.² ............................................ G01D 15/16

[58] Field of Search ................ 346/140, 139 R, 141; 310/8.5

[56] References Cited

UNITED STATES PATENTS

| | | | |
|---|---|---|---|
| 2,841,722 | 7/1958 | Gravley | 310/8.5 |
| 3,289,211 | 11/1966 | Klavsons | 346/140 |
| 3,341,859 | 9/1967 | Adams | 346/140 |
| 3,375,528 | 3/1968 | Klavsons | 346/140 |
| 3,821,747 | 6/1974 | Mason | 346/139 R |

*Primary Examiner*—Joseph W. Hartary
*Attorney, Agent, or Firm*—Frank R. Trifari

[57] ABSTRACT

A device for selectively depositing spots of a liquid ink electrode is provided for forming an electric field which acts on the meniscus of the liquid on a liquid-conduit as a deformation pulse is disposed behind the record carrier and the liquid-conduit is laterally movable with respect to the record carrier.

2 Claims, 5 Drawing Figures

DEVICE FOR SELECTIVELY TRANSFERRING SPOTS OF LIQUID INK

Figures 1A, 1B, 1C, 1D:
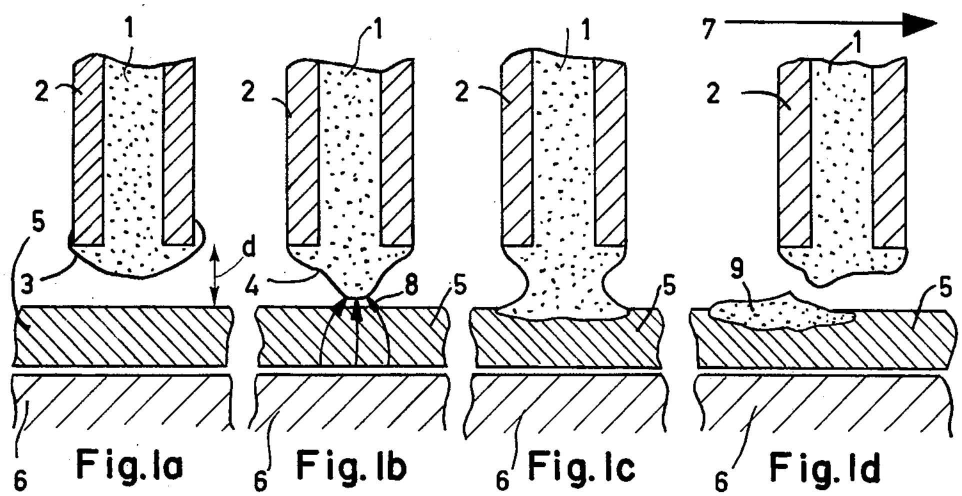

The invention relates to a device for selectively transferring spots of liquid ink from an ink conduit on to a record carrier.

Several methods are known in which deflected jets composed of droplets are used for recording. The ink droplets are produced through fine-bore nozzles by means of pressure or a high voltage. Because in this manner continuous sequences of drops are produced, each individual drop is to be charged by special electrodes and selected and deflected in vertical electric fields. The advantages of this method of controlling the recording, which method consumes substantially no energy and has substantially no inertia, are obvious. Unfortunately the deflectibility of individual drops is restricted within narrow limits by the aerodynamic and electrostatic interactions between successive drops, so that the quality of recordings made by such methods are unsatisfactory even with the use of complicated and expensive control means. A serious disadvantage in the formation of the drops by means of a high voltage is that this operation cannot be synchronized and a synchronous signal is substantially unobtainable.

In order to avoid the difficulties which arise in deflection and selection, systems have been proposed which use parallel arranged nozzles; they utilize a particular pumping effect and are even capable of producing discontinuous sequences of drops. Systems of this type comprise chambers which contain liquid and on which pressure can be exerted by piezoceramic plates and furthermore suitable supply and discharge ducts which when properly shaped are required to produce a pumping effect at a plurality of nozzles. Apart from the difficulties involved in the construction of the complicated flow ducts and in adequately coupling the piezoceramic bending oscillator to the liquid, such a device is particularly susceptible to clogging of the nozzles and ducts and to the occurrence of air bubbles in the writing liquid.

In all these methods complete drops are to be produced by an adequate use of energy. In order to overcome the surface tension there first has to be formed at the orifice of the nozzle a column of liquid the length of which is a multiple of the diameter and then drops have to be produced by constriction. If, however, the record carrier is brought near to the orifice, weak pressure fluctuations or weak electric fields may cause the liquid meniscus to vibrate, the vibrations resulting in the record carrier being wetted and hence the ink to be transferred. The difficulty of achieving spot-shaped recordings consists in that as a rule retraction of the ink no longer results in defined snapping. To obtain defined snapping it is known to convey the liquid ink to the transfer location in the meshes of a fine screen, i.e., in suitable amounts, and to effect the transfer by electric fields or electrostatic charging (German Patent Specification 1,772,939 corresponding to U.K. Patents 1,229,254 and 1,229,255). However, such a device requires additional ink feed means.

It is an object of the present invention to ensure a clean and exact ink transfer when making controllable spot-shaped recordings. According to the invention this is achieved in that an electrode for producing an electric field which acts on the liquid meniscus present on the liquid conduit is disposed behind the record carrier, the liquid conduit being laterally movable with respect to the record carrier.

Figure 2:
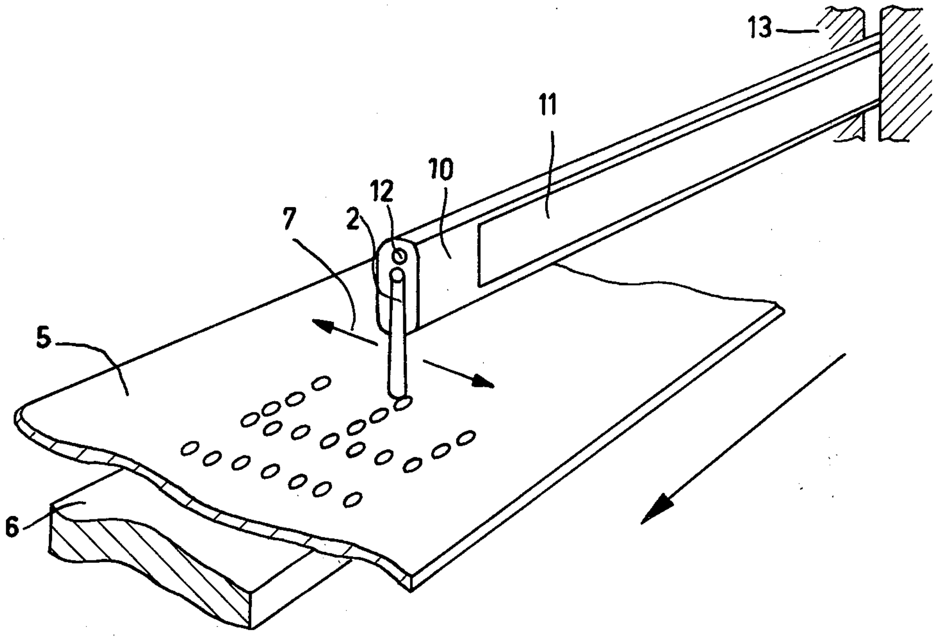

An embodiment of the invention will now be described, by way of example, with reference to the accompanying diagrammatic drawings, in which:

FIGS. 1*a*-1*d* illustrate schematically the ink transfer in stages, and FIG. 2 shows a device according to the invention which includes a bending beam.

Referring now to FIGS. 1*a* to 1*d*, the transfer is shown in stages. Ink 1 is supplied through a fine-bore capillary tube 2 which communicates with a supply container, not shown. The hydrostatic pressure is adjusted so that a convex meniscus 3 is formed but the surface tension of the liquid is not yet overcome. The spacing *d* between the tube and a record carrier 5 is sufficiently small so that when an electric voltage pulse is applied between the ink 1 (or the capillary tube 2) and an electrode arranged in the form of a conductive support 6 behind the record carrier an electric field 8 is built up which deforms the liquid surface 4 to the shape shown, but in the first stage of motion does not produce a gas discharge. When a capillary tube having an outer diameter of 0.4 mm, an ink having a surface tension of $4 \times 10^{-3}$ N/m and a pulse voltage of 800 volts are used, the spacing *d* must be less than 0.1 mm. In general it is necessary to find a compromise between a high resolution of the recording spots which is determined by the tube parameter and the possible transfer distance *d*. With these operational parameters a pulse duration of about 0.1 ms is sufficient to effect the wetting of the record carrier 5 shown in FIG. 1. Because of the unfavorable ratio of the capillary diameter to the spacing *d* the capillary tube must perform a rapid mechanical movement in the direction indicated by an arrow 7 to separate the liquid 1 in the capillary tube from the liquid-spot 9 left on the record carrier. When using ink of a viscosity twice that of water the motional speed must be about 1m/s. However, generally the viscosity of the ink may be adapted to the recording speed; with increased viscosity and reduced recording speed pulses of slightly longer duration have to be used owing to the greater damping of the vibration of the meniscus.

FIG. 2 shows a simple recording device. The capillary tube 2 is secured to the free end of a beam 10 which can be caused to oscillate laterally with respect to the surface of the paper 5 in the directions indicated by the arrow 7 at a frequency equal to its resonant frequency for bending oscillations. The free oscillator length and hence the resonant frequency can be matched to the desired recording speed by means of a clamping device 13. The beam 10 preferably is a piezoceramic bimorph bending element having electrode coatings 11 and central ducts 12, which ducts serve as ink supply ducts and also as a central electrode. Such a bending element of a length of about 30 mm can oscillate at a resonant frequency of 300 Hz over the entire width of a character to be written, as is shown in FIG. 2. When characters are written according to a matrix of seven rows and five columns, using both half cycles, the writing speed will thus be about 100 characters per second.

What is claimed is:

1. Apparatus for selectively depositing discrete spots of a liquid ink on an associated record carrier which comprises liquid conduit having one end disposed in spaced relation from a surface of the record carrier; means for selectively producing an electric field proximate to said one end for cooperation with the meniscus of an associated liquid ink in said conduit, said means including an electrode disposed in registered relation to said one end and on the opposite side of the associated record carrier; and means for moving said conduit in a continuous oscillating manner in a direction generally parallel to the record carrier, wherein said means for continuously moving includes a piezoelectric bending beam which is formed with ducts in fluid communication with said conduit for conveying the liquid.

2. The apparatus as described in claim 1 wherein said means for selectively producing an electric field produces pulses having a duration and repetition frequency of which are selected to be in a fixed ratio to the amplitude and the frequency of the bending beam oscillation.

* * * * *